(12) United States Patent
Kim

(10) Patent No.: US 6,742,540 B2
(45) Date of Patent: Jun. 1, 2004

(54) TWO-WAY ORIFICE CHECK VALVE DEVICE FOR HYDRAULIC CIRCUIT

(75) Inventor: Han-Soo Kim, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 5 days.

(21) Appl. No.: 10/326,016

(22) Filed: Dec. 18, 2002

(65) Prior Publication Data

US 2004/0000341 A1 Jan. 1, 2004

(30) Foreign Application Priority Data

Jun. 28, 2002 (KR) ......................... 2002-36941

(51) Int. Cl.7 ............................................... F16K 21/00
(52) U.S. Cl. .................... 137/513.3; 137/493; 137/613; 60/469; 192/109 F
(58) Field of Search ............... 137/513.3, 493, 137/493.8, 493.9, 599.01, 601.2, 613, 601.18, 504; 91/446, 447, 443; 60/469; 251/120; 192/109 F

(56) References Cited

U.S. PATENT DOCUMENTS

| | | | |
|---|---|---|---|
| 2,502,525 A | * 4/1950 | Krugler ....................... 62/50.7 |
| 2,555,334 A | * 6/1951 | Green ........................... 251/16 |
| 4,138,929 A | * 2/1979 | Peterson ....................... 91/446 |
| 4,209,988 A | 7/1980 | Langworthy et al. |
| 4,561,460 A | * 12/1985 | Smith ........................ 137/493.2 |
| 4,704,947 A | * 11/1987 | Schneider ..................... 91/518 |
| 4,821,622 A | 4/1989 | Burk |
| 5,035,312 A | * 7/1991 | Asayama et al. .......... 192/85 R |
| 5,127,313 A | * 7/1992 | Yonezawa ..................... 91/447 |
| 5,280,131 A | 1/1994 | Sarro |
| 5,590,936 A | 1/1997 | Reuter |
| 6,162,147 A | 12/2000 | Moorman |
| 6,205,875 B1 | * 3/2001 | Eike et al. ..................... 74/335 |
| 6,216,729 B1 | 4/2001 | Hambly et al. |
| 6,467,392 B1 | * 10/2002 | Breuning et al. ............. 91/447 |

FOREIGN PATENT DOCUMENTS

| | | |
|---|---|---|
| EP | 1 209 367 | 5/2002 |
| WO | WO 02/18822 | 3/2002 |

* cited by examiner

*Primary Examiner*—Ramesh Krishnamurthy
(74) *Attorney, Agent, or Firm*—Morgan Lewis & Bockius LLP

(57) ABSTRACT

A two-way orifice check valve device for a hydraulic circuit is disclosed. The hydraulic circuit which controls the engagement and release of a friction element, such as a clutch, is simplified to reduce the manufacturing cost, as well as improve functioning during the engagement and release of the friction element.

6 Claims, 5 Drawing Sheets

US 6,742,540 B2

TWO-WAY ORIFICE CHECK VALVE DEVICE FOR HYDRAULIC CIRCUIT

FIELD OF THE INVENTION

The present invention relates to a two-way orifice check valve device, and more particularly, to a two-way orifice check valve device for a hydraulic circuit, in which the control pressure is stabilized during the engagement and release of a clutch, and that simplifies the hydraulic circuit controlling the clutch.

BACKGROUND OF THE INVENTION

Generally, in a hydraulic circuit for controlling the actuation of a friction element such as a clutch, a structure prevents the abrupt engagement of the friction element. But a conventional hydraulic circuit may include many individual check valves, orifices, pressure relief valves, and the required connecting conduits. Each of these require machining and assembly. Accordingly, the conventional hydraulic circuit is unnecessarily complicated, large, and costly.

SUMMARY OF THE INVENTION

In accordance with a preferred embodiment of the present invention, the two-way orifice check valve for a hydraulic circuit includes an orifice check valve and a pressure relief valve in a single unit. The orifice check valve includes: a body part movably installed within a first pressure chamber of an inlet conduit; first and second orifices formed on both ends of the body part respectively; a conduit communicating between the first and second orifices; a plurality of elongate projections formed around the outside circumference of the body part, for forming a plurality of flow paths between the body part and the first pressure chamber; and an access allowing communication between the elongate projections and the conduit. The pressure relief valve includes: a second pressure chamber communicating to an outlet conduit and disposed adjacently to the first pressure chamber; and a valve element having an axial flow path disposed within the second pressure chamber and elastically supported by a return spring.

In a preferred embodiment of the invention a two-way orifice check valve device includes a body slidably installed within a first pressure chamber. The body slides between a first sealing position against an inlet conduit in response to a releasing fluid flow and a moveable sealing position against a valve element in response to an engaging fluid flow. The body includes a first orifice through which the entire releasing fluid flow is directed when the body is in the first position. The body also includes a second orifice through which at least part of the engaging fluid flow is directed when the body is in the second position. A channel or a plurality of channels along the body connect to an access within the body that allows fluid flow from the channel to enter a conduit within the body. This conduit leads to the first and second orifices. The channel is dimensioned and configured to allow the body to seat against the first pressure chamber when the body is in the first position. A spring seats the valve element against a third position (adjacent the first pressure chamber) during the releasing fluid flow and during an engaging fluid flow that is at less than a relief pressure. The valve element has a flow path through which the releasing fluid flow is directed before it flows though the first orifice and through which the engaging fluid flow is directed after flowing through the second orifice. When the engaging fluid flow is greater than the relief pressure the valve element moves from the third position and allows the engaging flow to bypass the second orifice, although some of the engaging fluid flow will still flow through the second orifice.

BRIEF DESCRIPTION OF THE DRAWINGS

For fuller understanding of the nature and objects of the invention, reference should be made to the following detailed description taken in conjunction with the accompanying drawings, in which.

Like numerals refer to similar elements throughout the several drawings.

DETAILED DESCRIPTION OF THE PREFERRED EMBODIMENT

Figure 1:
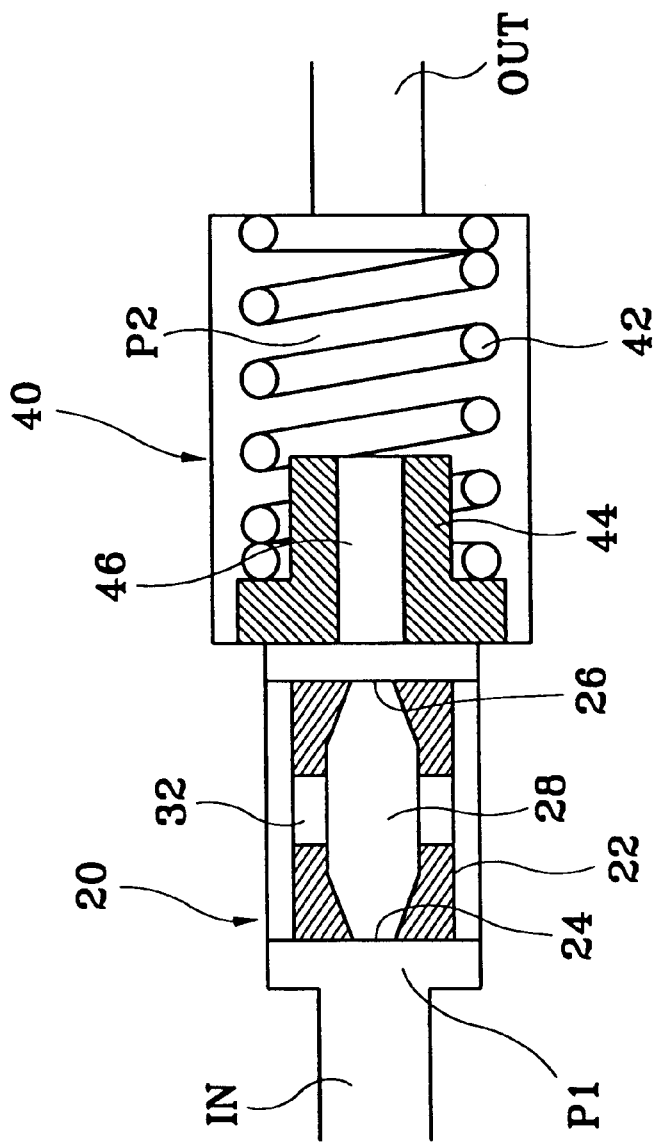
FIG. 1 is a cross-section of the hydraulic circuit having a two-way orifice check valve according to a preferred embodiment of the present invention.
Figure 2:
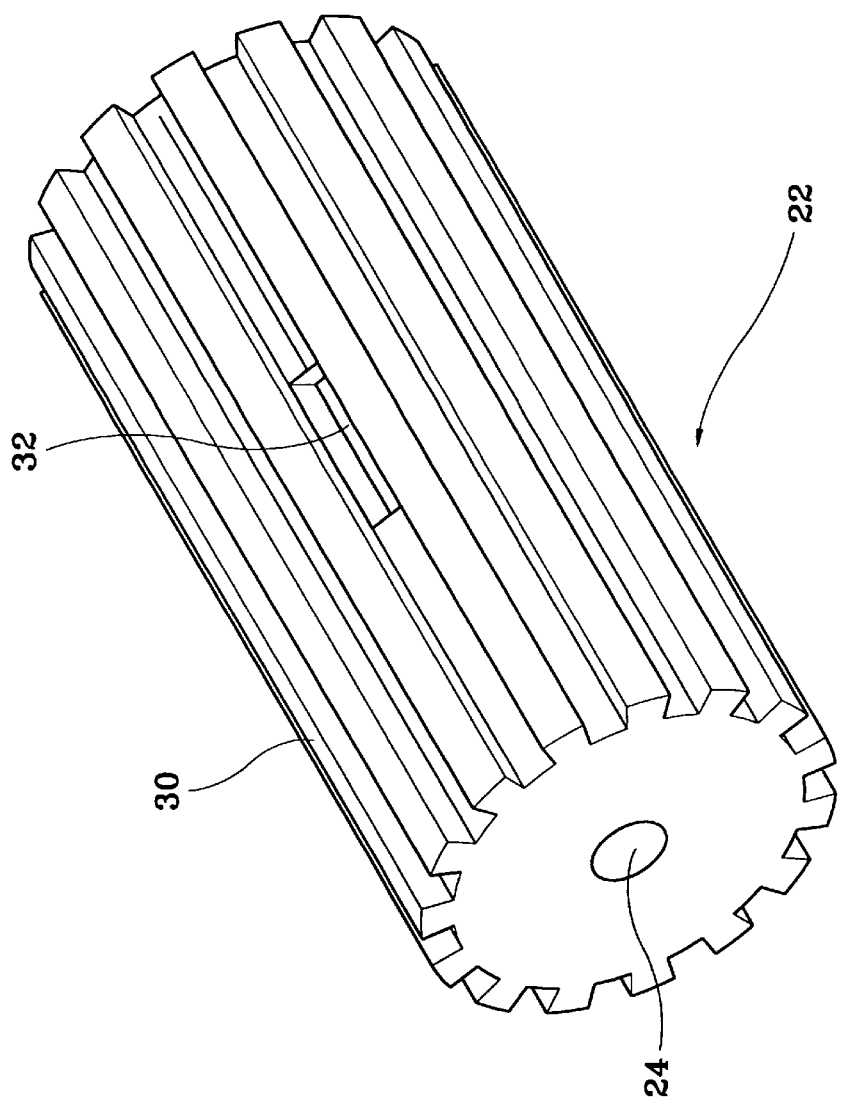
FIG. 2 is a perspective view of the two-way orifice check valve of FIG. 1.

The invention provides an apparatus that accomplishes the goals of the conventional device more efficiently, more economically, and more compactly. FIG. 1 illustrates the hydraulic circuit having a two-way orifice check valve according to a preferred embodiment of the present invention. In the present invention an orifice check valve 20 decreases the variations in the control pressure and responds to the acting direction of the control pressure between an inlet conduit IN and an outlet conduit OUT and directs that flow to either a first orifice 24 or a second orifice 26. A pressure relief valve 40 opens for a large pressure increase to quickly engage the friction element. A cylindrical body part 22 is movably installed within a first pressure chamber P1 of an inlet conduit IN. First and second orifices 24 and 26 are formed in both ends of the body part 22 respectively. A conduit 28 connects the first and second orifices 24 and 26. A plurality of elongate projections 30 (FIG. 2) are formed around an outside circumference of the body part 22 for forming a plurality of flow paths between the body part 22 and the first pressure chamber P1. An access 32 (FIG. 2) connects the flow paths between the elongate projections 30 and the body part 22 to the conduit 28.

In the pressure relief valve 40 (FIG. 1) a second pressure chamber P2, disposed adjacent to the first pressure chamber P1 communicates with an outlet conduit OUT. A valve element 44 disposed within the second pressure chamber P2 is elastically supported by a return spring 42 and has an internal flow path 46. The cross sectional area of the first pressure chamber P1 is smaller than that of the second pressure chamber P2, while the cross sectional area of the body part 22 of the orifice check valve 20 is also smaller that that of the valve element 44 of the pressure relief valve 40.

Accordingly, the body part 22, which is movably installed within the first pressure chamber P1, can enter into the second pressure chamber P2. The body part 22 can also press the valve element 44 against the return spring 42 into the second pressure chamber P2, depending on the pressure in the first pressure chamber P1. The cross sectional area of valve element 44 of the pressure relief valve 40 is smaller than that of the second pressure chamber P2 to allow fluid to flow through the space between the valve element 44 and the inner circumference of the second pressure chamber P2.

Figure 3:
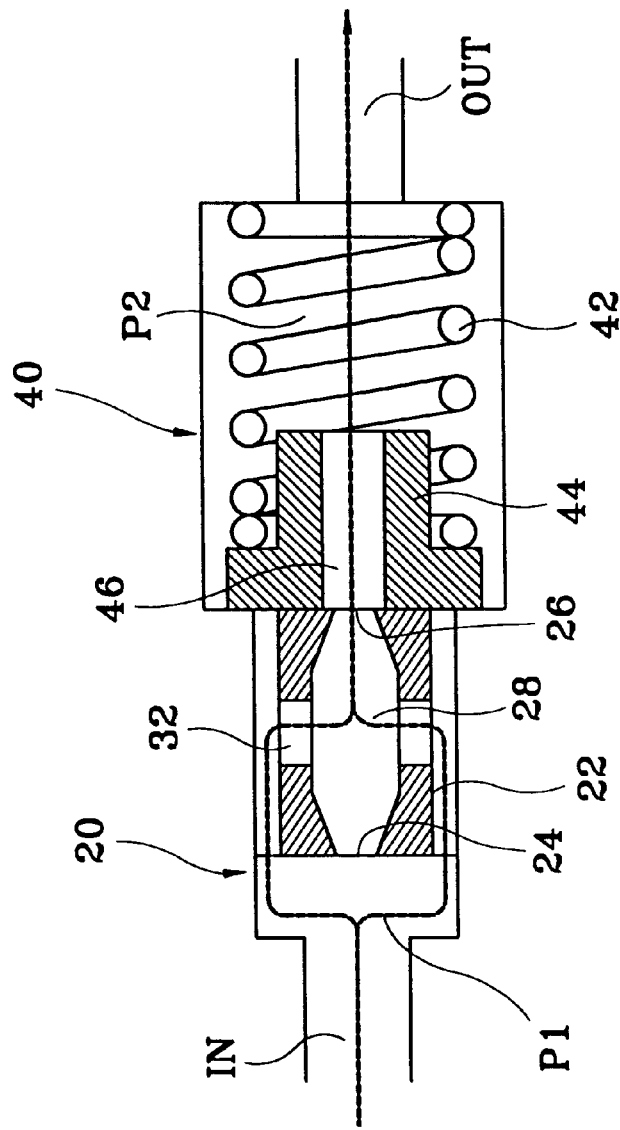
FIG. 3 illustrates the path of the control pressure during the engagement of the clutch in the hydraulic circuit of FIG. 1.

When the friction element is engaged by the control pressure in the hydraulic circuit, the following actuations occur. As shown in FIG. 3, the control pressure, which has been introduced through the inlet conduit IN into the first pressure chamber P1, flows through the access 32 and through the spaces between the plurality of the elongate projections 30 of the body part 22 into the body part 22. Under this condition, the body part 22 within the first pressure chamber P1 is pushed rightward by the control pressure to contact the valve element 44, but the valve element 44 is elastically supported by the return spring 42 on its rear part, and therefore, the motion of the valve element 44 is hindered. The control pressure which has been introduced into the body part 22 is transmitted through the second orifice 26 into the second pressure chamber P2. Then the control pressure passes through the flow path 46 of the valve element 44 and through the outlet conduit OUT to be supplied to the relevant friction element.

Figure 4:
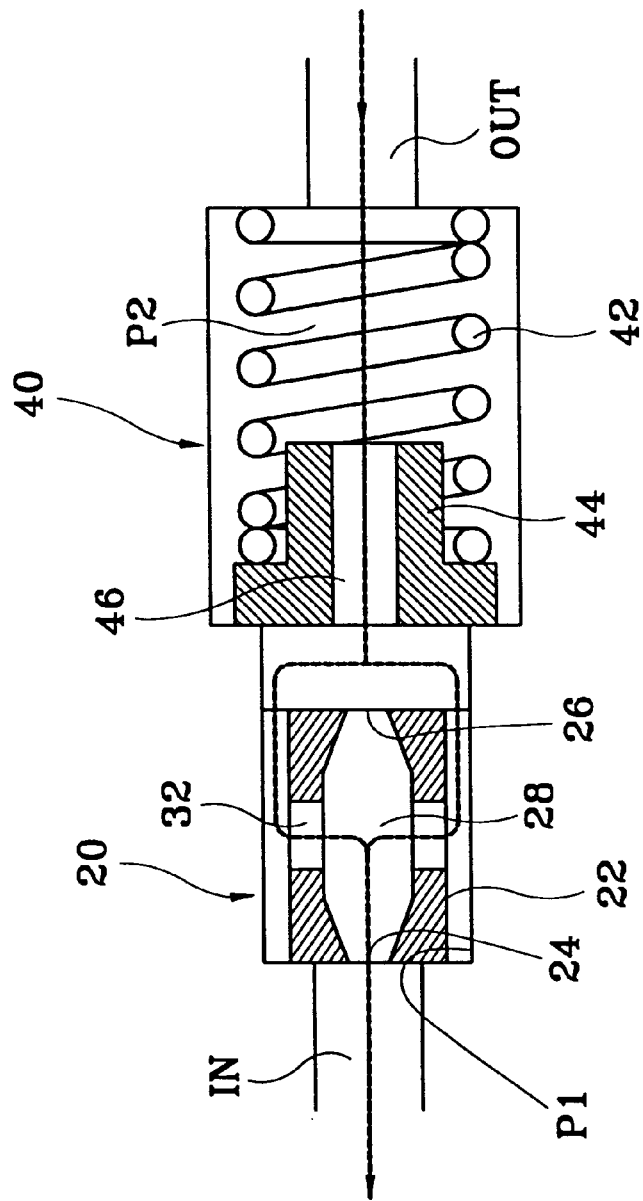
FIG. 4 illustrates the path of the control pressure during the release of the clutch in the hydraulic circuit of FIG. 1.

If the friction element is released, the following actuations occur, as shown in FIG. 4. That is, the control pressure, which has been introduced through the outlet conduit OUT into the second pressure chamber P2, passes through the axial flow path 46 to enter into the first pressure chamber P1. Under this condition, the body part 22 within the first pressure chamber P1 is pushed leftward by the control pressure. The valve element 44 within the pressure chamber P2 cannot enter into the first pressure chamber P1, since the cross sectional area of the first pressure chamber P1 is smaller than that of the second pressure chamber P2. Thus, the valve body 44 seals against the first pressure chamber P1, requiring all fluid to flow through flow path 46. The control pressure passes through the spaces between the plurality of the elongate projections 30 and through the lateral access 32 to enter into the body part 22. The control pressure then passes through the first orifice 24 to be discharged through inlet conduit IN of the hydraulic circuit.

Figure 5:
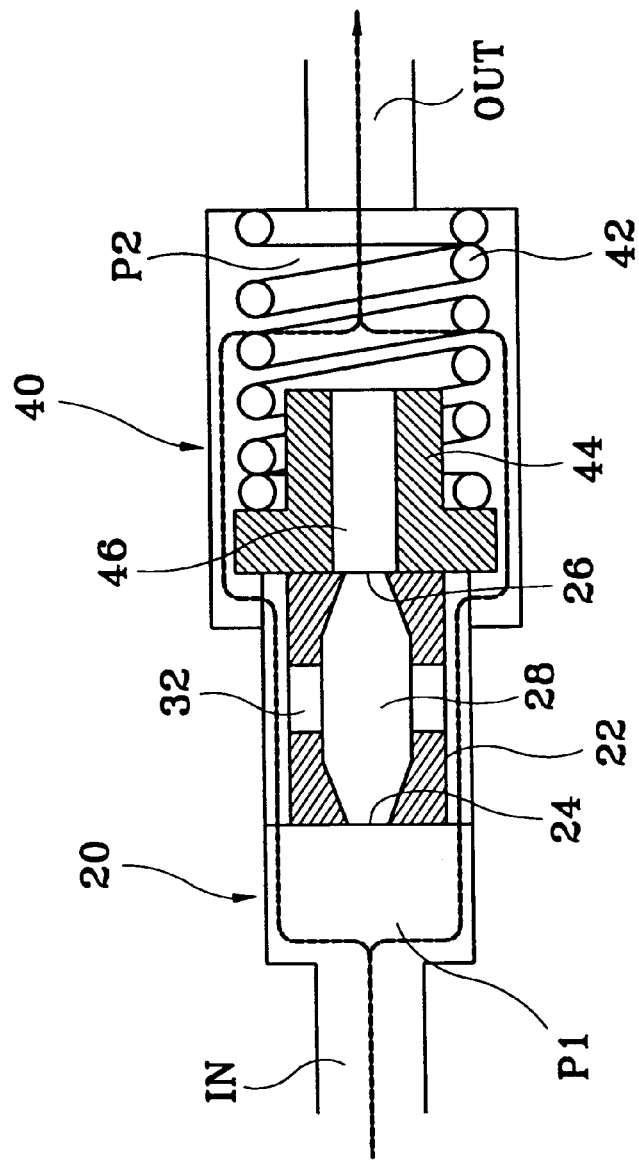
FIG. 5 illustrates the path of the high control pressure during the engagement of the clutch in the hydraulic circuit of FIG. 1.

When a large control pressure acts in the hydraulic circuit to quickly engage the friction element, the following occurs as shown in FIG. 5. The control pressure, which has been introduced through the inlet conduit IN into the first pressure chamber P1, passes through the plurality of the channels between the plurality of the elongate projections 30 to enter into the second pressure chamber P2. Under this condition, the body part 22 of the first pressure chamber P1 is pushed rightward by the control pressure. The body part 22 partly enters the second pressure chamber P2 by overcoming the force of the return spring 42, resulting in the valve element 44 (elastically supported by the return spring 42) being pushed rightward. Accordingly, the space between the body part 22 and the shell of the first pressure chamber P1, and the space between the valve element 44 and the second pressure chamber P2, are connected. The control pressure passes through the space between the valve element 44 and the inner circumference of the second pressure chamber P2 and out the the outlet conduit OUT to be supplied to the relevant friction element.

According to the present invention as described above, an orifice check valve 20 decreases the variations in the control pressure and determines the acting direction of the control pressure between an inlet conduit IN and an outlet conduit OUT, between which the control pressure flows to the friction element. Further, a pressure relief valve 40 allows large control pressure to flow through the device to make it possible to quickly engage the friction element. This simplifies the structure so that the component space and manufacturing cost is reduced.

The foregoing descriptions of specific embodiments of the present invention are presented for purposes of illustration and description. They are not intended to be exhaustive or to limit the invention to the precise forms disclosed. Obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents.

What is claimed is:

1. A two-way orifice check valve device for a hydraulic circuit, comprising: an orifice check valve, said orifice check valve comprising:
    a cylindrical body part movably installed within a first pressure chamber of an inlet conduit;
    first and second orifices formed on both ends of said body part, respectively;
    a conduit communicating between said first and second orifices;
    a plurality of elongate projections formed around an outside circumference of said body part, for forming a plurality of flow paths between said body part and said first pressure chamber; and
    an access allowing communication between the elongate projections, through said body part, to said conduit; and
    a pressure relief valve, said pressure relief valve comprising:
        a second pressure chamber communicating to an outlet conduit and disposed adjacently to said first pressure chamber; and
        a valve element having an axial flow path disposed within said second pressure chamber and elastically supported by a return spring.

2. The two-way orifice check valve device as claimed in claim 1, wherein said first pressure chamber has a cross sectional area smaller than that of said second pressure chamber.

3. The two-way orifice check valve device as claimed in claim 1, wherein the body part of said orifice check valve has a cross sectional area smaller than that of said valve element of said pressure relief valve.

4. The two-way orifice check valve device as claimed in claim 1, wherein said valve element of said pressure relief valve has a cross sectional area smaller than that of said second pressure chamber.

5. A two-way orifice check valve device, comprising:
    a body slidably installed within a first pressure chamber, said body sliding between a first sealing position against an inlet conduit in response to a releasing fluid flow and a second moveable sealing position against a valve element in response to an engaging fluid flow, and said body comprising:
        a first orifice through which the entire releasing fluid flow is directed when the body is in the first position;

a second orifice through which at least part of the engaging fluid flow is directed when the body is in the second position; and at least one channel along the body that connects to an access within the body, said access allowing fluid flow from the at least one channel to enter a conduit within the body to the first and second orifices, and wherein the at least one channel is dimensioned and configured to seal against the first pressure chamber when the body is in the first position; and a spring seating the valve element against a third position during the releasing fluid flow and during an engaging fluid flow that is at less than a relief pressure, and wherein:

the valve element has a flow path through which the releasing fluid flow is directed before flowing though the first orifice and through which the engaging fluid flow is directed after flowing through the second orifice; and when the engaging fluid flow is greater than the relief pressure the valve element moves from the third position and allows the engaging flow to bypass the second orifice.

6. A two-way orifice check valve device, comprising:

a first pressure chamber;

a body slidably installed within a first pressure chamber, said body sliding between a first seated position against an inlet conduit and a second moveable seated position against a valve element and said body containing first and second orifices;

a second pressure chamber containing the valve element;

a spring seating the valve element to a third position against the first pressure chamber, wherein:

during a releasing fluid flow the body is in the first position and fluid flow is controlled by the first orifice;

during an engaging fluid flow that is at less than a relief pressure the body is in the second position and fluid flow is controlled by the second orifice; and during an engaging fluid flow that is greater than a relief pressure the valve element moves from the third position to allow a part of the fluid to flow past the second orifice.

* * * * *